Feb. 26, 1957  A. F. HILLEBRAND  2,782,800
VALVE
Filed Nov. 30, 1951
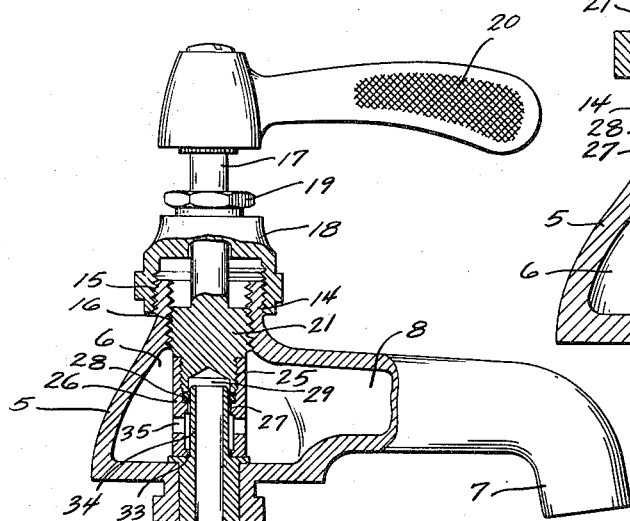
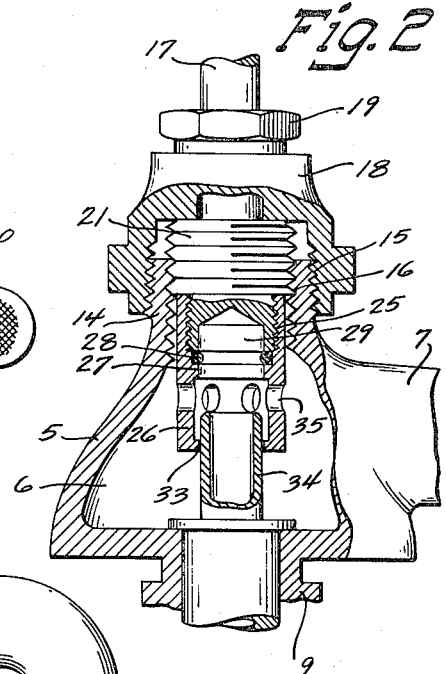
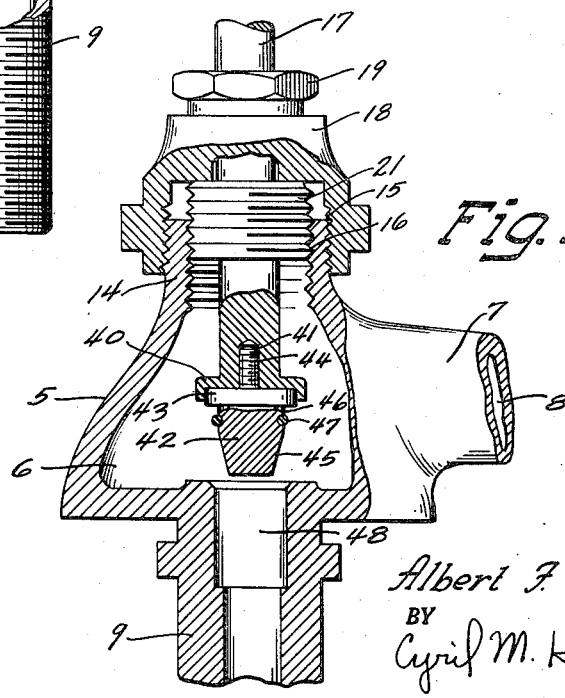
INVENTOR.
Albert F. Hillebrand
BY
Cyril M. Hajewski
ATTORNEY United States Patent Office 2,782,800
Patented Feb. 26, 1957

2,782,800
VALVE
Albert F. Hillebrand, West Allis, Wis.
Application November 30, 1951, Serial No. 259,179
1 Claim. (Cl. 137—625.38)

This invention relates generally to valves, and more particularly to an improved valve for controlling a hydraulic flow.

The normal construction of valves for controlling the flow of fluid through a spout, such as in the common water faucet, consists of a seat formed on the inlet, with an axially movable stem arranged to be forced upon the seat for sealing the inlet to preclude the flow of fluid. It is the usual practice to provide a removable washer on the end of the stem, disposed to cooperate with the seat for regulating the fluid flow. The stem is caused to move relative to the seat by rotating it relative to the faucet body with which it has threaded engagement. As the stem is rotated, its associated washer rotates with it while it is being forced down upon the seat, causing both the washer and seat to be subjected to a severe abrasive action. Since the washer is fabricated of a relatively soft material, it wears much faster than the seat, causing a leaky faucet, and necessitating its frequent replacement. The replacement of these washers is a source of annoyance and inconvenience, and in apartments and commercial establishments represents a substantial expense.

It is therefore a general object of the present invention to provide an improved valve for controlling a hydraulic flow, in which the wear on the movable parts is reduced to a minimum.

Another object of the present invention is to provide an improved valve in which a positive seal to stop the flow of fluid is effected by radial pressure upon a circular sealing member.

Another object is to provide an improved valve in which the pressure upon the sealing member for terminating the flow of fluid through the valve, is of a predetermined constant value, beyond the control of the operator.

Another object is to provide an improved valve construction for controlling the flow of fluid, which may be readily applied to replace the present valves in existing water faucets.

A further object is to provide an improved valve of sturdy but simple and inexpensive construction which is reliable and efficient in operation.

According to this invention the new and improved valve construction comprises an annular seal formed of an elastic material and retained in a peripheral groove formed either within a cylindrical opening or about the outer diameter of a mating plug. The cylindrical opening and plug are movable relative to each other, and disposed so that the plug can enter the opening. As it does so, the annular seal is compressed between the wall of the opening and the outer diameter of the plug to form a positive seal. Either the opening or the plug may constitute the fluid inlet. When the plug functions as the inlet it is formed with an axial bore which is connected to the source of fluid. When the seal is compressed between the walls of these two members it terminates the flow of fluid.

The foregoing and other objects of the invention, which will become more fully apparent from the following detailed description, may be achieved by means of the exemplifying apparatus depicted in and described in connection with the accompanying drawings in which:

Figure 1 is a view partly in side elevation and partly in vertical section of an ordinary water faucet embodying the novel features of the present invention, the valve being shown in its closed position;

Figure 2 is an enlarged fragmentary view substantially in vertical section, of the water faucet depicted in Figure 1, with the valve shown in its open position; and Figure 3 is an enlarged fragmentary view substantially in vertical section of a water faucet embodying a modification of the invention, which is particularly adaptable for replacing the present valve construction in existing faucets.

Referring more specifically to the drawing and particularly to Figures 1 and 2 thereof, the water faucet there shown embodying the novel features of the present invention comprises a valve body 5 shaped to form a chamber 6 serving as a housing for the valve structure. Formed integrally with the valve body 5 is a discharge nozzle 7 having an internal passage 8 in communication with the chamber 6. Depending from the valve body 5, and also formed integrally therewith, is an inlet pipe 9, having communication with a source of fluid, in a well known manner.

The top of the valve body 5 is shaped to form a circular portion 14, which is provided with an external thread 15 and an internal thread 16. A valve stem 17 extends above the valve body 5 through a principal gland 18 and an auxiliary gland 19. The principal gland 18 has threaded engagement with the external thread 15 of the circular portion 14, while the auxiliary gland 19 has threaded engagement with an internal thread formed in the upper portion of the principal gland 18. Suitable packings (not shown) are used in conjunction with the glands 18 and 19 for preventing the escape of fluid around the valve stem 17 from the chamber 6.

The outwardly extending portion of the valve stem 17 has secured thereto a handle 20 for manipulating the stem in a rotary movement. The opposite end of the valve stem 17 is provided with a threaded enlargement 21 which has threaded engagement with the internal thread 16 of the circular portion 14 of the valve body 5. With this arrangement a rotary movement imparted to the valve stem 17 will effect a corresponding rotary movement of its threaded enlargement 21, causing the latter to move upwardly or downwardly relative to the valve body 5, depending upon its direction of rotation.

The general faucet arrangement described above is identical for the embodiment illustrated in Figures 1 and 2, and the alternate embodiment depicted in Figure 3, and therefore like reference numerals have been used for identifying similar parts. The particular valve structure shown in Figures 1 and 2 includes a thread 25 of reduced diameter formed as an extension of the threaded enlargement 21 for receiving an internal thread of a cylinder 26.

An internal annular shoulder 27 is formed at approximately the center of the cylinder 26 so that as the cylinder 26 is threaded onto the thread 25, the end of the thread 25 and the shoulder 27 cooperate to form a groove for retaining an annular seal 28. The extension of the threaded enlargement 21 upon which the thread 25 is formed, is provided with a shallow bore 29 of the same diameter as the inner diameter of the shoulder 27. The inner diameter of the annular seal 28 is smaller than the diameter of the bore 29 and the inner diameter of the shoulder 27, so that a portion of the body of the seal 28 extends inwardly beyond the inner walls of the bore 29 and the shoulder 27.

The bottom of the cylinder 26 is also provided with an inwardly extending annular shoulder 33 which girdles a plug 34 and serves to guide the cylinder 26 for axial movement over the plug 34. The plug 34 is connected to the inlet pipe 9 and is provided with an axial bore having communication with the pipe 9 to receive the flow of fluid from the source.

With the valve in its open position as illustrated in Figure 2, fluid entering the bore of the plug 34 is discharged into the interior of the cylinder 26 and escapes therefrom through a plurality of radial openings 35 formed about the periphery of the cylinder 26. The fluid then enters the chamber 6 from which it flows into the internal passage 8 to be discharged through the nozzle 7.

As the handle 20 is manipulated to revolve the threaded enlargement 21 relative to its mating thread to cause it to move downwardly, its associated cylinder 26 moves with it, over the plug 34. In Figure 2 the valve is shown in its wide position, but as the cylinder 26 moves downwardly over the plug 34, its radial openings 35 move downwardly over the plug 34, causing the plug to interfere with the flow of fluid through the openings. Such interference increases as the openings 35 continue to move downwardly, resulting in a corresponding gradual decrease of the flow of fluid through the openings 35 and therefore the discharge nozzle 7.

The quantity of fluid discharged from the nozzle 7 gradually decreases until the annular seal 28 contacts the end of the plug 34. The plug 34 fits snugly into the inner diameter of the shoulder 27, and has an outer diameter greater than the inner diameter of the annular seal 28. The seal is fabricated of an elastic material having the characteristics of rubber, and it has been found that neoprene or a similar synthetic material functions very efficiently for this purpose although other materials may be used. As the seal 28 is forced downwardly over the plug 34 it is compressed slightly between the outer wall of the plug 34 and the inner wall of the cylinder 26 to form a positive seal as depicted in Figure 1 where the valve is shown in its closed position. The end of the plug 34 is chamfered as shown in the drawing to facilitate the passing of the seal over the plug and to prevent damage to the seal from contact with sharp edges.

It will be noted that when the seal 28 is compressed between the walls of the cylinder 26 and the plug 34 it forms a positive seal to preclude any further flow of fluid into the chamber 6, and the seal 28 is subjected to a constant predetermined pressure beyond the control of the operator. Any further manipulation of the handle 20, will cause the plug 34 to enter further into the bore 29 but the pressure on the seal will not vary. The seal 28 is constantly lubricated by the fluid flowing through the plug 34 so that a sliding action between it and the plug 34 may be readily effected with a minimum of friction, resulting in operation of the valve with practically no wear on the seal 28.

With the above construction, if it should be necessary to replace the seal 28, this may be readily accomplished by removing the gland 18 and unscrewing the threaded enlargement 21 out of engagement with the valve body 5. The cylinder 26 may then be disconnected from the threaded enlargement 21, and the seal 28 is then free to be removed from its position on the shoulder 27 and replaced with another. The faucet can then be easily reassembled, and it is ready for operation.

There is illustrated in Figure 3 a modification of the above construction which is particularly adaptable for replacing existing water faucet valves in which a rubber washer is forced upon a seat to control the flow of water. In Figure 3 the faucet proper, other than the specific valve construction, is identical to the faucet shown in Figures 1 and 2, and as previously mentioned, like parts have been given identical reference numerals.

In the common type of faucet valve presently in use, the inner end of the stem 17 is provided with a flange 40 as shown in Figure 3 with a downwardly facing recess for receiving the well known rubber or fiber washer (not shown). The washer is retained in the recess by a screw (not shown) engaging a tapped hole 41 formed axially in the end of the stem 17. The old valve construction is replaced by the arrangement of the present invention by removing the rubber washer and substituting in lieu thereof a plug 42 having a circular flange 43 which fits snugly into the recess formed in the flange 40. The plug 42 is provided with a threaded extension 44 which has threaded engagement with the tapped hole 41 to attach the plug 42 securely to the stem 17.

The plug 42 has a tapered portion 45 and an upper cylindrical portion 46, the latter portion being provided with a peripheral groove for retaining an annular seal 47. The annular seal 47 is inserted in its cooperating groove merely by forcing it over the tapered portion 45 until it engages the groove. To accommodate the plug 42 and its associated annular seal 47 the inlet of the faucet is reamed to form a bore 48. The bore 48 is sufficiently large to receive the cylindrical portion 46 of the plug 42, but of a smaller diameter than the outer diameter of the annular seal 47, so that as the seal 47 is forced into the bore 48 it is compressed to seal off the flow of water through the inlet.

In Figure 3 the valve is shown in its fully open position wherein a full flow of water enters the chamber 6 to be discharged through the nozzle 7. As the plug 42 is lowered from the position shown in Figure 3 by manipulating the handle 20, the tapered portion 45 enters the bore 48 to interfere with the flow of water through the bore and decrease the flow. The flow is decreased gradually as the plug 42 is lowered into the bore 48, until the seal 47 enters the bore and is compressed between the plug 42 and the walls of the bore to seal off the flow of water.

As described for the previous embodiment, the annular seal 47 is subjected to a predetermined pressure which is not under the control of the operator. Any further manipulation of the handle 20 will only result in repositioning the seal within the bore 48 but will not vary the pressure upon it. Again, the seal 47 is constantly exposed to water for efficient lubrication, which serves to facilitate its movement into and out of the bore 48 and minimizes wear.

From the foregoing detailed description and explanation of the operation of two specific embodiments of this invention, it is apparent that there has been provided an improved valve construction for the convenient and efficient control of the flow of a fluid, which effectively forms a positive seal for stopping the flow of water, while being subjected to a very minimum of wear, resulting in a long life for the sealing medium and its related parts.

Although but two embodiments of the invention have been set forth in considerable detail to constitute a full disclosure, it is to be understood that persons skilled in the art may utilize the novel principles here taught, in apparatus differing in construction from the particular mechanism herein described without departing from the spirit and scope of the invention, as defined in the subjoined claims.

The principles of the invention having now been fully explained in connection with the foregoing description of the illustrative embodiments, the invention is hereby claimed as follows:

In a valve, a valve body having a threaded opening and a chamber, a plug having an axial bore connected to an inlet and extending into said chamber, a stem having an enlarged thread in engagement with said threaded opening to render it axially movable by rotating it relative to said valve body, a threaded extension of lesser diameter than said enlarged thread and extending coaxially therefrom into said chamber in axial alignment with said plug, a cylinder having an internal thread in meshing engagement with said threaded extension to close its bore at the threaded end and render it axially movable with said stem with its open end encompassing said plug, said cylinder having one or more transverse openings located between its threaded portion and its open end, an annular shoulder formed on the inner diameter of said cylinder between said transverse openings and said threaded portion to form an annular groove with the end of said threaded extension, a seal of elastic material and toroidal configuration retained within said annular groove and having an inner diameter smaller than either the diameter of said cylinder bore or the outer diameter of said plug but radially compressible between the walls of said plug and said groove, and a discharge nozzle in communication with said chamber, whereby the fluid flowing through said plug enters said cylinder and escapes through said openings into said chamber to be discharged through said nozzle, and as the cylinder moves over said plug to increasingly encompass it, said openings move adjacent to said plug causing the plug to interfere with the flow of fluid into them to gradually decrease the flow of fluid therethrough until said annular seal is moved over said plug to girdle it and cause said seal to be compressed between the walls of said groove and said plug to effect a seal and terminate the flow of fluid to said openings.

References Cited in the file of this patent

UNITED STATES PATENTS

| | | |
|---|---|---|
| 1,072,971 | Meyer | Sept. 9, 1913 |
| 1,197,583 | Sheridan | Sept. 5, 1916 |
| 1,267,365 | Borchert | May 28, 1918 |
| 1,697,516 | Hele-Shaw | Jan. 1, 1929 |
| 2,195,069 | Arbogast | Mar. 26, 1940 |
| 2,252,923 | Granetz | Aug. 19, 1941 |
| 2,360,733 | Smith | Oct. 17, 1944 |
| 2,406,178 | Walley | Aug. 20, 1946 |
| 2,490,511 | Courtot | Dec. 6, 1949 |
| 2,509,671 | Christensen | May 30, 1950 |
| 2,513,976 | Weatherhead | July 4, 1950 |
| 2,530,090 | Smith | Nov. 14, 1950 |
| 2,556,308 | Weatherhead | June 12, 1951 |
| 2,574,054 | Miller | Nov. 6, 1951 |
| 2,594,626 | Earle | Apr. 29, 1952 |

FOREIGN PATENTS

| | | |
|---|---|---|
| 610,243 | Great Britain | Oct. 13, 1948 |